United States Patent
Chaaya et al.

(10) Patent No.: US 10,549,611 B2
(45) Date of Patent: Feb. 4, 2020

(54) INFRARED WELDED EXTERIOR PANEL ASSEMBLY AND PROCESS OF MAKING SAME

(71) Applicant: Magna Exteriors Inc., Concord (CA)

(72) Inventors: Riad Chaaya, Clarkston, MI (US); Mark P. Birka, Northville, MI (US); William J. J. Harney, Toronto (CA); Heiner Salzmann, Metamora, MI (US); Christopher J. Kuntze, Goodrich, MI (US); Keijo J. Huotari, Fenton, MI (US)

(73) Assignee: Magna Exteriors Inc., Concord, Ontario (CA)

( * ) Notice: Subject to any disclaimer, the term of this patent is extended or adjusted under 35 U.S.C. 154(b) by 0 days.

(21) Appl. No.: 15/778,036

(22) PCT Filed: Jan. 30, 2017

(86) PCT No.: PCT/IB2017/000116
§ 371 (c)(1),
(2) Date: May 22, 2018

(87) PCT Pub. No.: WO2017/130064
PCT Pub. Date: Aug. 3, 2017

(65) Prior Publication Data
US 2018/0345767 A1 Dec. 6, 2018

Related U.S. Application Data

(60) Provisional application No. 62/288,786, filed on Jan. 29, 2016, provisional application No. 62/426,097, filed on Nov. 23, 2016.

(51) Int. Cl.
*B60J 5/10* (2006.01)
*B29C 65/14* (2006.01)
(Continued)

(52) U.S. Cl.
CPC ........... *B60J 5/107* (2013.01); *B29C 65/1412* (2013.01); *B29C 65/1419* (2013.01);
(Continued)

(58) Field of Classification Search
CPC .. B60J 5/107; B29C 65/1467; B29C 66/1122; B29C 66/114; B29C 66/301;
(Continued)

(56) References Cited

U.S. PATENT DOCUMENTS

| 5,071,500 A | 10/1991 | Kumagai et al. |
| 5,522,954 A | 6/1996 | Bennett et al. |

FOREIGN PATENT DOCUMENTS

| DE | 102004039312 A1 | 3/2006 |
| EP | 0296283 A1 | 12/1988 |
| WO | 2017130064 A1 | 8/2017 |

OTHER PUBLICATIONS

International Search Report for International Application No. PCT/IB2017/000116, Filed Jan. 30, 2017.

*Primary Examiner* — D Glenn Dayoan
*Assistant Examiner* — Melissa Ann Bonifazi
(74) *Attorney, Agent, or Firm* — Warn Partners P.C.

(57) ABSTRACT

An exterior body panel assembly having a Class A painted surface, mold-in color or non-Class A surface, and process of infrared welding components of the assembly. Panels of the assembly are placed on a nesting structure and the inside half of the structures are brought together with the other for a fit check. Panels are separated and an infrared heating fixture then heats the various areas to be heated on the panels. The areas on the panels are heated depending on the thicknesses of the parts at each area and surface geometries to be welded. The parts are immediately clamped back together under pressure for joining and cooling of the joined surfaces in the clamped arrangement.

17 Claims, 13 Drawing Sheets

(51) Int. Cl.
  *B29C 65/78* (2006.01)
  *B29C 65/00* (2006.01)
  *B62D 29/04* (2006.01)
  *B62D 33/077* (2006.01)
  *B29K 509/08* (2006.01)
  *B29L 31/30* (2006.01)
  *B29K 23/00* (2006.01)

(52) U.S. Cl.
  CPC ...... *B29C 65/1467* (2013.01); *B29C 65/7802* (2013.01); *B29C 66/114* (2013.01); *B29C 66/1122* (2013.01); *B29C 66/301* (2013.01); *B29C 66/3474* (2013.01); *B29C 66/3494* (2013.01); *B29C 66/54* (2013.01); *B29C 66/71* (2013.01); *B29C 66/7212* (2013.01); *B29C 66/7394* (2013.01); *B29C 66/73921* (2013.01); *B29C 66/8141* (2013.01); *B29C 66/81261* (2013.01); *B29C 66/81815* (2013.01); *B29C 66/919* (2013.01); *B29C 66/91413* (2013.01); *B29C 66/929* (2013.01); *B29C 66/949* (2013.01); *B62D 29/048* (2013.01); *B62D 33/077* (2013.01); *B29K 2023/12* (2013.01); *B29K 2509/08* (2013.01); *B29L 2031/3055* (2013.01)

(58) Field of Classification Search
  CPC . B29C 66/3474; B29C 66/3494; B29C 66/54; B29C 66/66; B29C 66/71; B29C 66/73921; B29C 66/7394; B29C 66/31413; B29C 66/919; B29C 66/949; B29C 65/7802; B29C 66/81261; B29C 66/81815; B29C 66/8141; B29C 65/1419; B62D 29/048; B62D 33/077; B29L 2031/3055; B29K 2023/12
  See application file for complete search history.

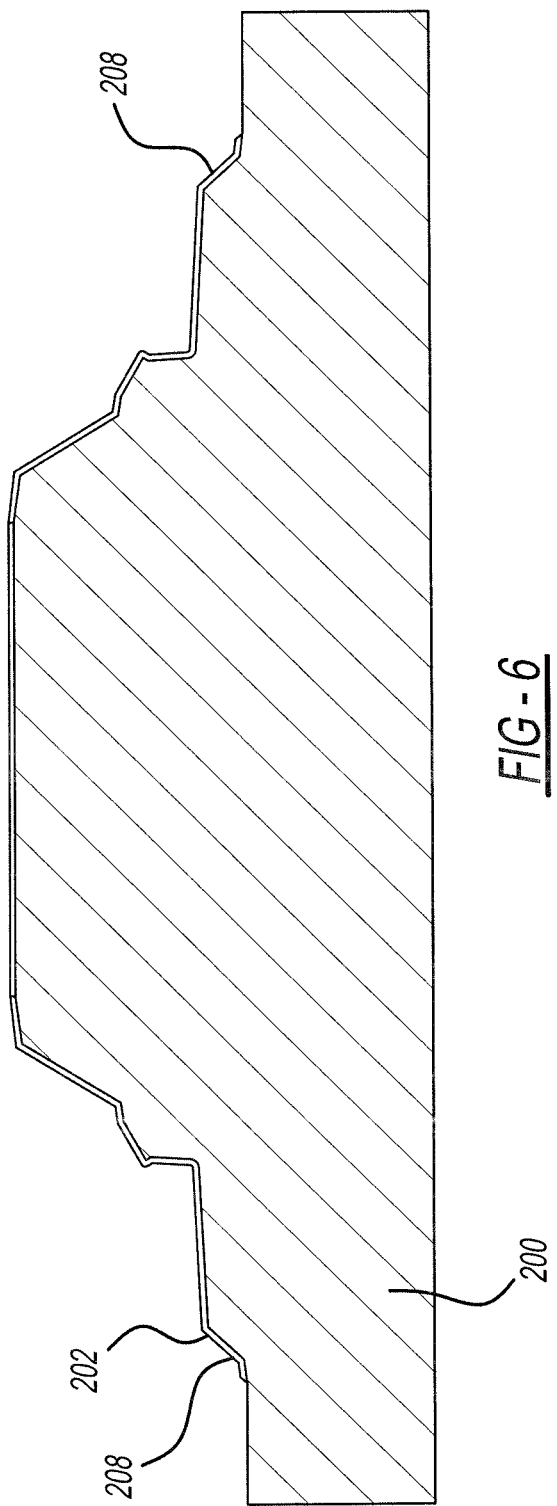

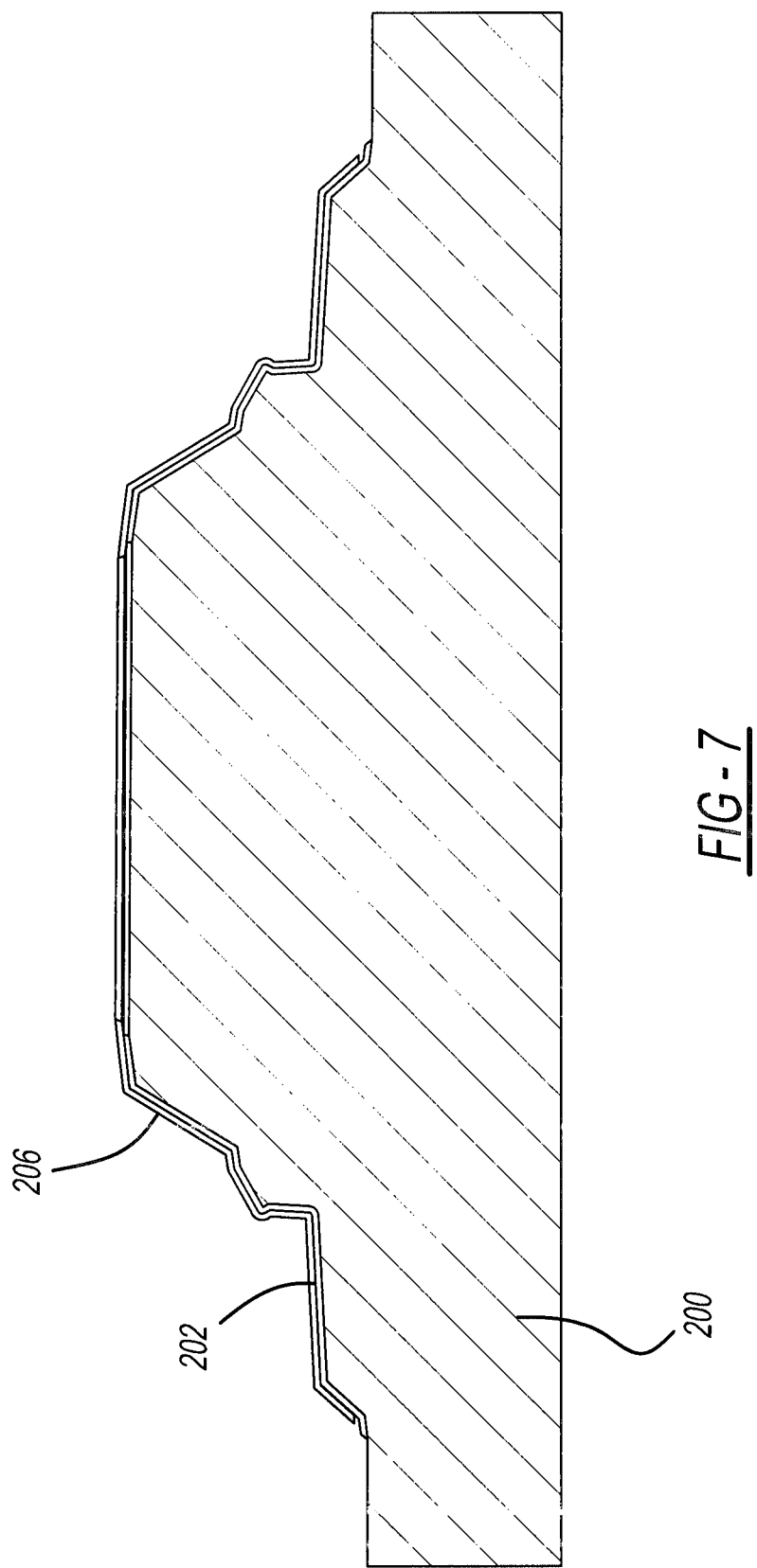

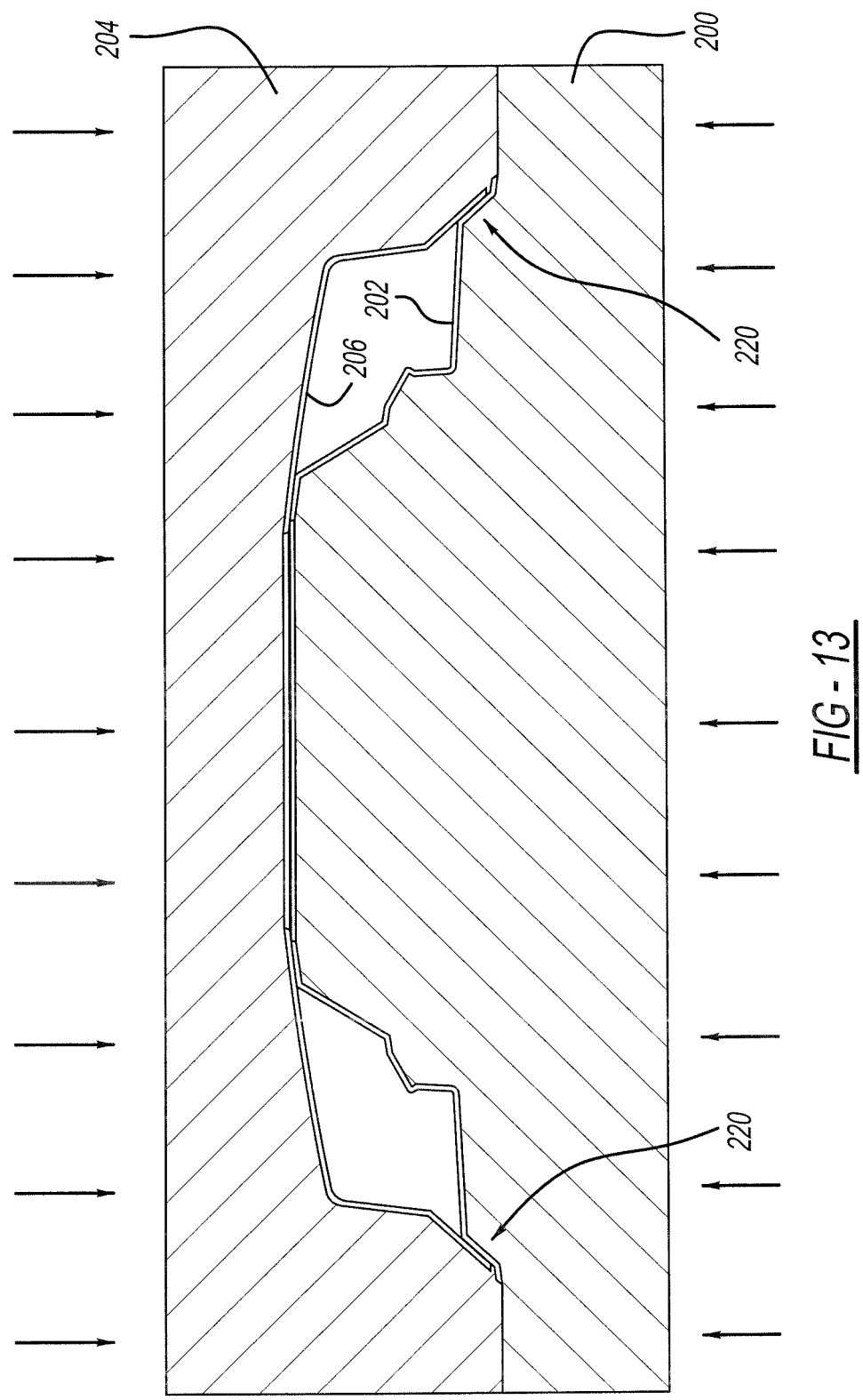

INFRARED WELDED EXTERIOR PANEL ASSEMBLY AND PROCESS OF MAKING SAME

CROSS-REFERENCE TO RELATED APPLICATIONS

This application is a PCT International Patent Application claiming priority to U.S. Provisional Application No. 62/288,786, filed Jan. 29, 2016 and U.S. Provisional Application No. 62/426,097, filed Nov. 23, 2016. The disclosures of the above applications are incorporated herein by reference.

FIELD OF THE INVENTION

The present invention relates to exterior body panel assemblies for automobiles. More specifically, to a composite liftgate and method of manufacture.

BACKGROUND OF THE INVENTION

One of the current trends in the automobile industry is to lower vehicle weight to help achieve better fuel economy, thus helping to meet fuel economy standards and to offset the higher fuel prices. Lighter weight components are also attempted for easier manipulation by a user when desired. Another trend is that there is a broader range of vehicle models, which in turn reduces the volume of vehicles produced on a per model basis. Sport utility and crossover vehicles remain popular, and these typically include fairly heavy exterior body panels, such as rear liftgates, making these parts of the vehicle a target area for weight reduction. Such parts as liftgates for any vehicle are traditionally made from stamped steel panels that are heavy and have a high tooling cost. Traditional steel liftgates are expensive investments, heavy, take up a lot of OEM floor space in areas from the stamping plant, body shop, paint shop, and trim line. Further, steel liftgates have limited styling flexibility, take a lot of time to tool, and have corrosion concerns. Acrylonitrile Butadiene Styrene (ABS) is an alternative for larger parts because ABS is not as heat sensitive or is not back-side read through prone. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal components.

Thermoplastic polyolefin (TPO)-filled TPO (e.g., glass filled) or non-filled TPO—is another alternative material to steel and SMC but it is a difficult material to work with. TPO has been used for some parts but is thought of as being difficult to use because it is too soft, sensitive, flexible or difficult to process for making larger parts. The use of TPO has generally been limited to smaller parts. TPO has not been used for liftgate panels or other large exterior panels. TPO parts have also been generally limited to being welded first before painting Class A surfaces. Welding before painting is inefficient because it adds processing steps, e.g., powerwashing, masking, etc.

Thermoplastic composite type materials used for liftgate applications also have difficulty meeting customer performance specifications. More specifically some customer performance specifications include requirements that the liftgate prevent scattering of components at the time of the collision to the back door and the prevention of components or objects from passing through the liftgate ingressing or egressing from the vehicle interior. One of the problems that has been encountered is that pieces of the composite liftgate, when experiencing a crash are projected into the interior compartment of the vehicle. It is therefore desirable to prevent pieces, and particular large pieces of the liftgate from scattering into the interior compartment of the vehicle. It is also desirable to prevent objects from passing from the inside of the vehicle compartment through the liftgate. Traditionally liftgates have incorporated a steel cable or wire connected between the interior panel and exterior panel using fasteners. The steel cable serves as a tether to hold the components together even upon breaking. While this arrangement can work to pull together very large broken pieces of a liftgate at the time of collision, it does not prevent or stop larger pieces that shatter and form shards from being projected into the department at the time of the collision. In other words unless the liftgate breaks near an anchor point of the steel tether any shattering effect will not hold the shattered pieces together.

In another aspect of the invention it is desirable to develop new manufacturing techniques for creating a composite liftgate, or any other vehicle part, that provides sufficient strength, yet maintains or presents a desirable "Class-A" finish when viewed from the exterior. Multiple parts of any exterior body assembly must be joined together. Bonding is more typical for joining panels of these assemblies, but bonding is time consuming, expensive, very sensitive, weaker and takes a lot of manufacturing space. By way of nonlimiting example, bonding systems require the following sensitive perimeters and steps: clean, flame, prime, adhesive, time, temperature, etc. Typical bonding uses adhesive, i.e., urethane adhesive, and/or a combination of adhesive and fasteners. Bonding, ultrasonic welding, or vibration welding of Class-A, painted thermoplastic automobile exterior parts are all particularly problematic and fail to provide required strength and surface appearance. Known attempts to try to overcome the problems with bonding have utilized ultrasonic welding, vibration welding (bulbs or wires), and are utilized on some spoiler applications, but there are issues with Class-A read through, sink marks, strength or structure weakness, limited shape allowance, the weld not being continuous, and not sealed, etc.

One of the current methods in automotive part manufacturing is ultrasonic welding or a combination of vibration and infrared welding of non-Class A parts. The combination creates debris. And vibration welding requires a smooth part curvature for moving back and forth while the weld is created.

Accordingly, for all these reasons, there exists a need for exterior body panels that are lightweight and meet strength requirements and surface appearance, and a thermoplastic welding method for exterior body panels that eliminates or reduces the problems or concerns associated with bonding systems.

SUMMARY OF THE INVENTION

The infrared welding stays in the weld zone and is cleaner than other welding. The infrared welding is also sealing; not just welding two or more parts together. This improves strength, appearance and seals against gas fumes, water, etc. Also since an adhesive seal or sealer is being eliminated by use of infrared welding the material, e.g., TPO, itself, this eliminates material and processing steps. Bonding typically needs flaming or other steps before placing the material on and further processing to connect the parts.

The present invention generally relates to a process for infrared welding exterior body panel assemblies utilizing an infrared welding tooling system to join at structural panels of an exterior body panel. In a preferred embodiment, the assembly is a liftgate assembly. The infrared welding allows for more shapes, depending on the application, an improved condition to reduce or eliminate read through on Class A surfaces, and continuous weld(s) that are water tight and creates a seal. In addition, the infrared welding creates the structure needed to achieve predetermined requirements, depending on the particular application, and creates the structure needed to meet or exceed other welding methods and bonding.

There is also provided joint designs for welding thermoplastic exterior body panels. Predetermined plastic joint designs are also provided suitable to allow manufacturing and assembly by infrared welding, and to provide the benefits of eliminating or reducing the problems that have been associated with bonding systems. The joint design includes at least one basic construction, which includes, but is not limited to, surface to surface, ribs to surface, ribs to ribs, and combinations thereof.

In general, an infrared welding tooling assembly is provided with one half to operably hold at least a first component and a second half to operably hold at least a second component, and at least one infrared heating fixture to selectively heat predetermined areas of the first and second component to at least one predetermined temperature for at least one predetermined duration. In one embodiment, the infrared heating fixture is operably configured and suitable to allow zone control or variable heating perimeters corresponding to the particular materials and structure of the components and desired liftgate assembly. The process includes determining these requirements and controlling the application of heat suitable to generate the desired welds, e.g., predetermined areas of the first and/or second components have heating durations that vary from one another, heated at the same time, some areas heated sooner than others, same temperatures, different temperatures, and/or combinations thereof, etc.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a front elevation view of an exemplary first panel on an exemplary first tool nest, according to another embodiment of the present invention;

FIG. 7 is a front elevation view of an exemplary second panel on the first panel on the first nest of FIG. 6, according to the present invention;

DETAILED DESCRIPTION OF THE PREFERRED EMBODIMENTS

Figure 1:
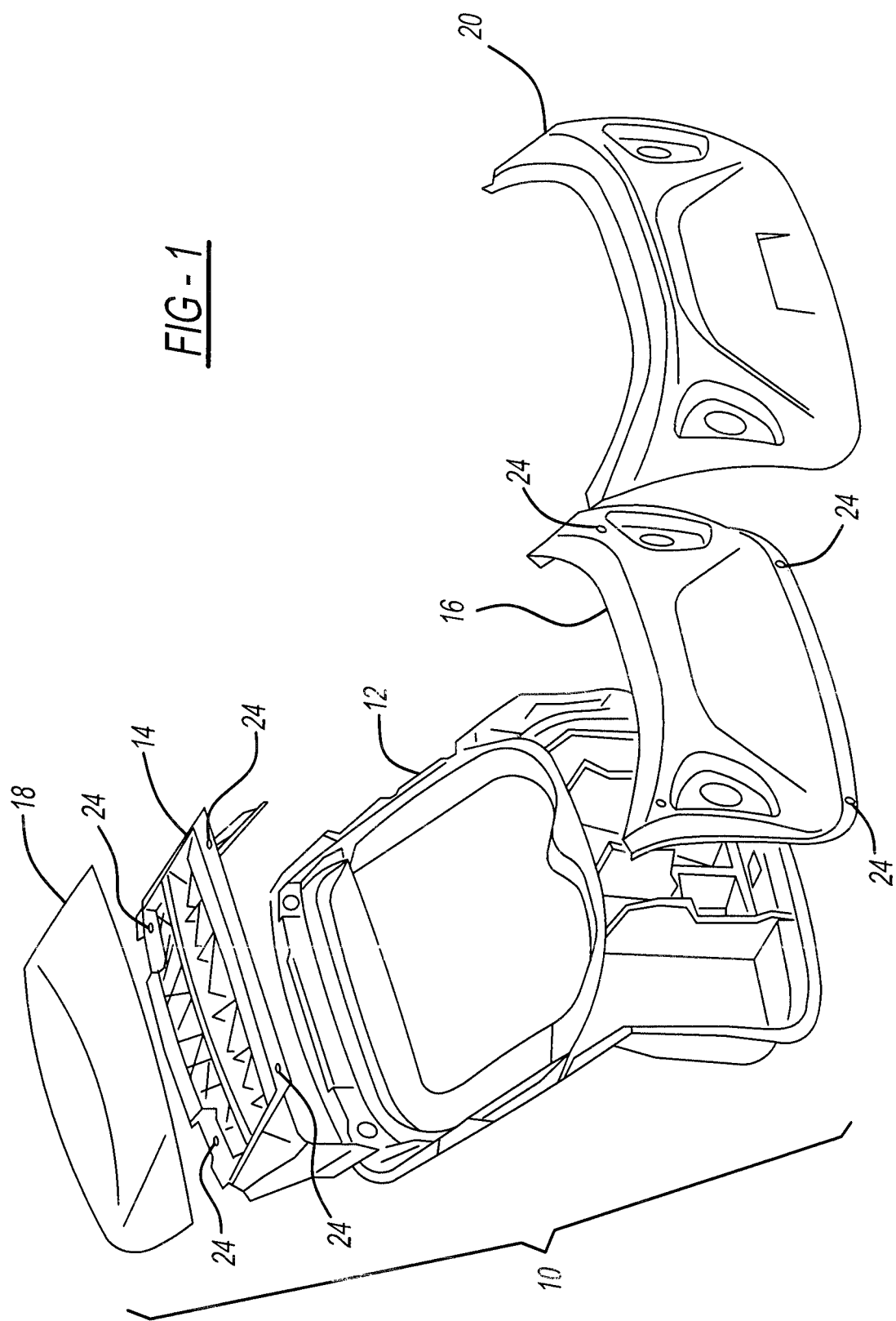
FIG. 1 is an exploded perspective side view of a composite liftgate including infrared welded structural panels, according to an embodiment of the present invention.
Figure 2:
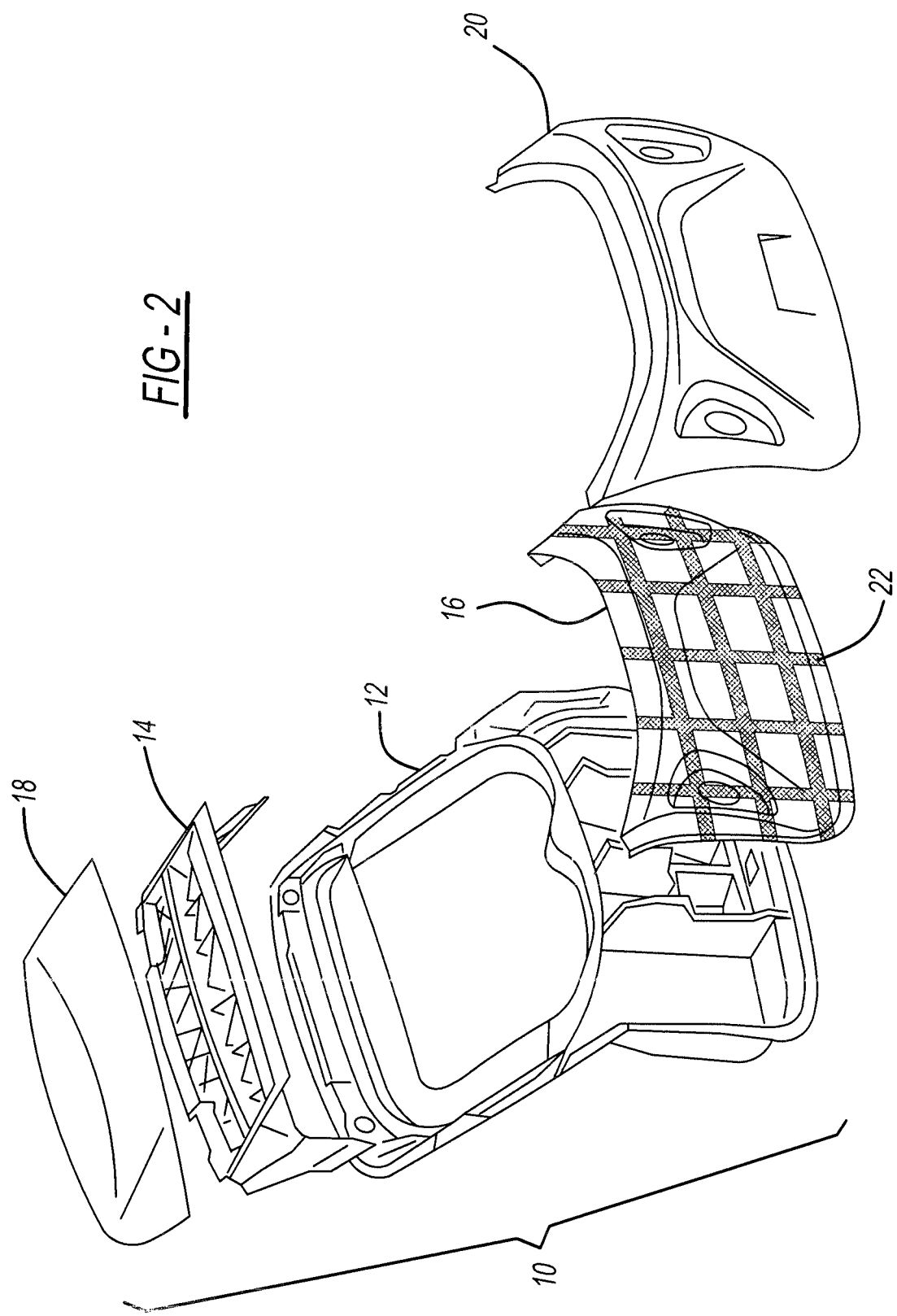
FIG. 2 is an exploded perspective side view of a composite liftgate having infrared welded structural panels and unidirectional tap, in accordance with another embodiment of the present invention.
Figure 3:
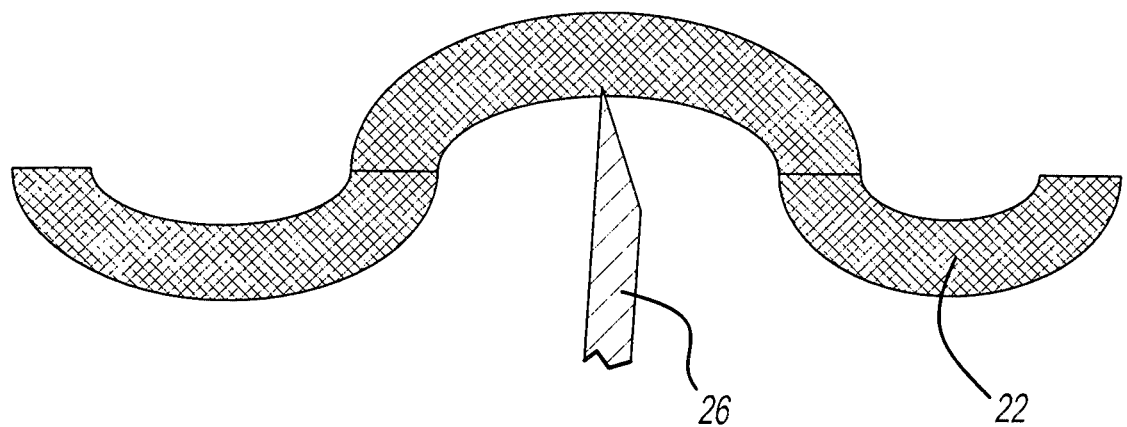
FIG. 3 is an enlarged side elevation view depicting a rib on the structural panel to maintain slack for the unidirectional tap, in accordance with the present invention.

The following description of the preferred embodiment(s) is merely exemplary in nature and is in no way intended to limit the invention, its application, or uses.

Referring to the figures generally, there are several advantages obtained by the present invention. One aspect is that when one or more larger components, e.g., liftgate inner panels and outer panels, that is/are out of tolerance, e.g., warped, twisted, or otherwise out of specification or nested imperfectly, are infrared welded according to the present inventive process—the assembly is brought into tolerance. Another aspect of the present invention is that components made of sensitive materials (e.g., such as filled or non-filled thermoplastic polyolefin (TPO) parts, TPO parts with Class A surface(s), painted parts, molded-in color parts, TPO material with painted Class A surface(s), sensitive to read through, heat sensitive, etc) can be infrared welded with another component, e.g., a structural component, according to the present inventive process with improved surface appearance. Thus, read through to finished show surfaces can be eliminated, according to an aspect of the present invention. In particular, larger components, e.g., liftgate panels, made of sensitive materials and that already have a finished show surface can be infrared welded to like larger components or to structural composite larger panels, according to the process in one aspect of the present inventive process, without read through. According to the present invention—a completed surface having a large surface area can be provided first and then panels are welded together—even for TPO panels, which are difficult to work with. Further, if either or both of the panels are out of tolerance—they are compressed into a net fit. In addition, the structural stiffness gain on the whole assembly, e.g., infrared welded liftgate assembly, is about 20-30% compared to bonded assemblies.

According to an aspect of the present invention, the decreased cycle time to connect larger panels is also a significant advantage over conventionally thought possible. Material handling out of the tool can also be started within only a few seconds after compression since the infrared welded panels cool quickly. The infrared welded panels also provide a stronger connection, e.g., 2 times stronger than adhesive. Generally, the strength also depends on the part geometry and panel materials, but withstanding 2,000 psi or more is within the scope of the present invention. According to an aspect of the present invention, weld joint geometry optimizes the weld strength and read through prevention. At the weld joint it is desired to provide an adequate weld strength without compromising finished surface appearance. A particularly preferred embodiment includes a plurality of stand-off ribs formed on at least one of the panels at the weld joint, which does not inhibit adequate weld strength while improving read through prevention.

The body panel assembly—most preferably an exterior multi-component assembly—of the present invention includes at least one first panel, e.g., inner panel, connected to at least one second panel, e.g., a lower outer panel or a spoiler with a finished part surface or a modular panel or reinforcement panel. The first and second panels are infrared welded together. Predetermined joint geometries are selected depending on the application for accommodating the balance of improved welds and finished part surface appearance. Additional panels can be used, e.g., such as reinforcement panels which are infrared welded to the first panel. While a liftgate assembly is depicted throughout the figures and described herein, it is within the scope of the invention for the exterior body panel assembly—in particular that include larger sized vehicle panels that have infrared weldable areas—including, but not limited to, a front end carrier assembly, door assembly, hood assembly, bumper assembly, tailgate assembly, multi-piece construction or any other type of exterior body assembly of any kind—in particular those with body panel(s) having a Class-A, painted surface, thermoplastic polyolefin grained/stippled surface, molded-in color, etc.

Thus in a preferred embodiment of the present invention there is provided a body panel assembly including at least one first panel, e.g., an inner panel, and at least one second panel. The second panel is selected from one or more of an upper reinforcement panel, modular panel, first outer panel or second outer panel.

Referring now to FIGS. 1-4, according to an embodiment of the present invention the exterior body panel assembly shown generally at 10 includes at least one first panel 12, at least one upper reinforcement 14 and/or at least one modular panel 16, at least one first outer panel 18 and at least one second outer panel 20. The modular panel 16 and upper reinforcement 14 are infrared welded to the inner panel 12 to reinforce the structure and provide a plurality of mechanical attachments 24 to the first and second outer panels 18 and 20. Preferably, for infrared welding, the modular panel 16 and first panel 12 have at least two weld joints, e.g., a flat-to-flat (or surface-to-surface) configuration or ribs-to-flat (or rib-to-surface) weld joint configuration. Preferably, for infrared welding, the reinforcement panel 14 and first panel 12 have at least two weld joints, e.g., a flat-to-flat (or surface-to-surface) configuration or ribs-to-flat (or rib-to-surface) weld joint configuration.

The method according to an embodiment of the present invention is a method of making the exterior body panel assembly 10 for a vehicle, which is shown as a vehicle liftgate, using infrared welding rather than using adhesives to connect the parts—which is conventional. The method includes the steps of providing the at least one inner panel 12 that is a structural thermoplastic component. Also provided is the upper reinforcement 14 and/or the modular panel 16, preferably both. Additionally the first outer panel 18, which is a spoiler panel, is provided having a finished part surface, e.g., Class A, painted, etc. Additionally it is within the scope of the invention for there to be the at least one second outer panel 20 that is a lower panel having a Class A painted surface that is also provided. It is also within the scope of this invention for other second outer panels such as pillar covers to be included.

In carrying out the method the at least one inner panel 12 is loaded onto a first nest. Then in a next step the upper reinforcement panel 14 or modular panel 16 are placed onto the inner panel 12. Then the first nest and a second nest are brought together to check the fit of the inner panel 12 in the upper reinforcement 14 or modular panel 16 with the inner panel 12. Then a step of separating the inner panel 12 in the upper reinforcement 14 or modular panel 16 as well as the first and second nests is carried out where the upper reinforcement 14 or the modular reinforcement 16 is held by the second nest. Then a step of sliding or otherwise moving at least one infrared heating fixture between the first and second nests occurs, where the infrared heating fixture has a plurality of infrared heat sources, e.g., infrared emitters.

Next the first and second nests are brought together to a predetermined distance from the plurality of infrared heat sources and then a step of heating the material of the inner panel 12 and the upper reinforcement 14 or modular panel 16 occurs. Next a step of separating the first and second nests from the area of the infrared heating fixture occurs and the infrared heating fixture is moved away from the area of the first and second nests. Then the first and second nests are brought together and a clamping pressure is applied to the inner panel 12 and the upper reinforcement 14 or modular panel 16 to facilitate the attaching or welding of the components.

Figure 4:
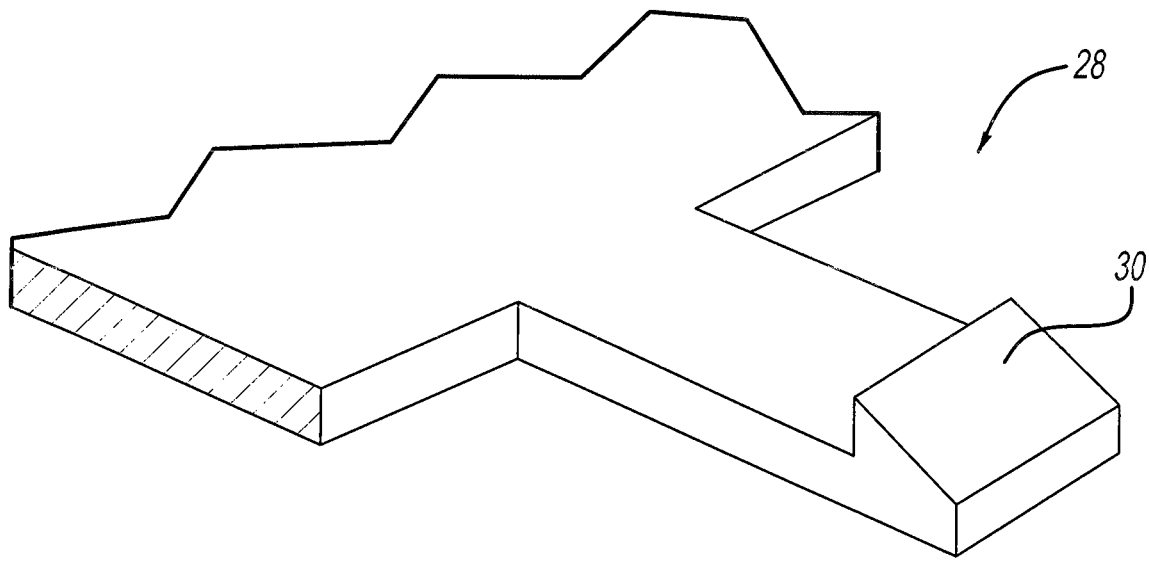
FIG. 4 is a perspective view of an exemplary mechanical attachment to connect panels to the structural panels, according to an embodiment of the present invention.

Then in a final step the first outer panel 18 (e.g., spoiler) and/or the at least one second outer panel 20 are attached to the respective upper reinforcement panel 14 or modular panel 16 using a mechanical connection at a plurality of attachment points 24, such as a snap-fit arrangement with corresponding features provided on the modular panel 16 and second outer panel 20 and corresponding features provided on the upper reinforcement 14 and first outer panel 18. There is provided a plurality of mechanical attachments 28, e.g., fasteners, screws, bolts, snap-fit attachment features, or any other suitable mechanical feature and combinations thereof. FIG. 4 depicts an exemplary preferred mechanical attachment 28 that includes a snap-fit fastener feature 30 to connect the second outer panel 20 to the modular panel 16 at attachment points 24, or to connect the first outer panel 18 to the modular panel 14 at attachment points 24. Alternatively, the mechanical attachment 28 snap-fit fastener feature 30 is provided on the modular panel 16 or reinforcement panel 14 for snap-fit to attachment points provided on the second outer panel 20 or first outer panel 18, respectively. More or less mechanical attachments 28 and attachment points 24 (and alternative locations for both) are contemplated depending on the application without departure from the present invention. There is no seal between the second outer panel 20 and modular panel 16. The connection between the modular panel 16 and inner panel 12 is by infrared welding, which provides sealing. Additionally, the welding process will correct any warpage in the assembly.

Forming an exterior body panel assembly as outlined above allows for the exterior panels that have a painted Class A finish to be connected without using infrared welding. This provides the benefit of eliminating a possibility of having a read mark develop on the surface of the Class A part.

In another aspect of the invention the modular panel 16, which is preferably made from polymeric material, has unidirectional tape 22 overmolded into the modular panel 16. The unidirectional tape 22 can be glass fiber, but can also be woven fiber that is preimpregnated with polypropylene and is overmolded into the modular panel 16. The unidirectional tape 22 serves as a tether that can take up load after an initial crash or accident and reduce or prevent fragments of the modular panel 16 from passing into the vehicle or flying away from the vehicle upon impact. In another embodiment, the unidirectional tape 22 is additionally provided on the upper reinforcement 14. In another embodiment, the tether is at least one metal wire or wire or plastic mesh.

A preferred embodiment incorporates a plurality of molded ribs 26 on the modular panel 16 to maintain slack for the unidirectional tape 22. Sections of the unidirectional tape 22 bridge the top of respective molded ribs 26. Thus the modular panel 16 has designed in slack, via the ribs 26, for the unidirectional tape 22 to take up load after initial crash.

In an alternative embodiment, the modular panel 16 and/or upper reinforcement 14 is/are not used, in which case the at least one second panel is a first outer panel or second outer panel, preferably both (e.g., a spoiler and lower outer panel), infrared welded directly to the first panel 12. Most preferably, the at least one second panel is thermoplastic polyolefin and has a Class A painted surface.

An embodiment of the present invention is directed generally to an infrared welding process for making exterior body panel assemblies. There is provided an infrared welding tooling system comprising at least a first half or "first nest" or "lower portion" or "first tool nest", and at least a second half or "second nest" or "upper portion" or "second tool nest". These part nests are suitable to hold thermoplastic components, such as liftgate panels. At least one infrared heating fixture is provided to heat at least two components of the liftgate assembly in desired locations, such that welds are formed when these components are pressed together. In a preferred embodiment, the process additionally includes providing at least one additional component, e.g., spoiler, infrared welded to one of the other components.

The process of the present invention generally includes placing the inner structural panel and outer show surface panel on the nesting structure and then bringing the inside half of the structure together with the other for a fit check. Separating the panels and bringing an infrared heating fixture in between the panels for heating of the various flanges to be heated. Selectively heating the areas depending on the thicknesses of the parts at each area and surfaces to be welded. Immediately clamping the parts back together under pressure for joining and cooling of the joined surfaces in the clamped arrangement. In another embodiment, a similar process for a second operation is carried out to infrared weld a third panel to the subassembly. Three or more operations to infrared weld more component(s) to an assembly is contemplated without departing from the scope of the present invention.

Referring to all of the figures generally, there are several predetermined part design and process variables, e.g., heat, pressure, emitter distance, hold time, Class A surface cooling, etc, to be determined and optimized. Optimal design and process parameters are determined for best weld strength and appearance depending on the applications.

Figure 5A:
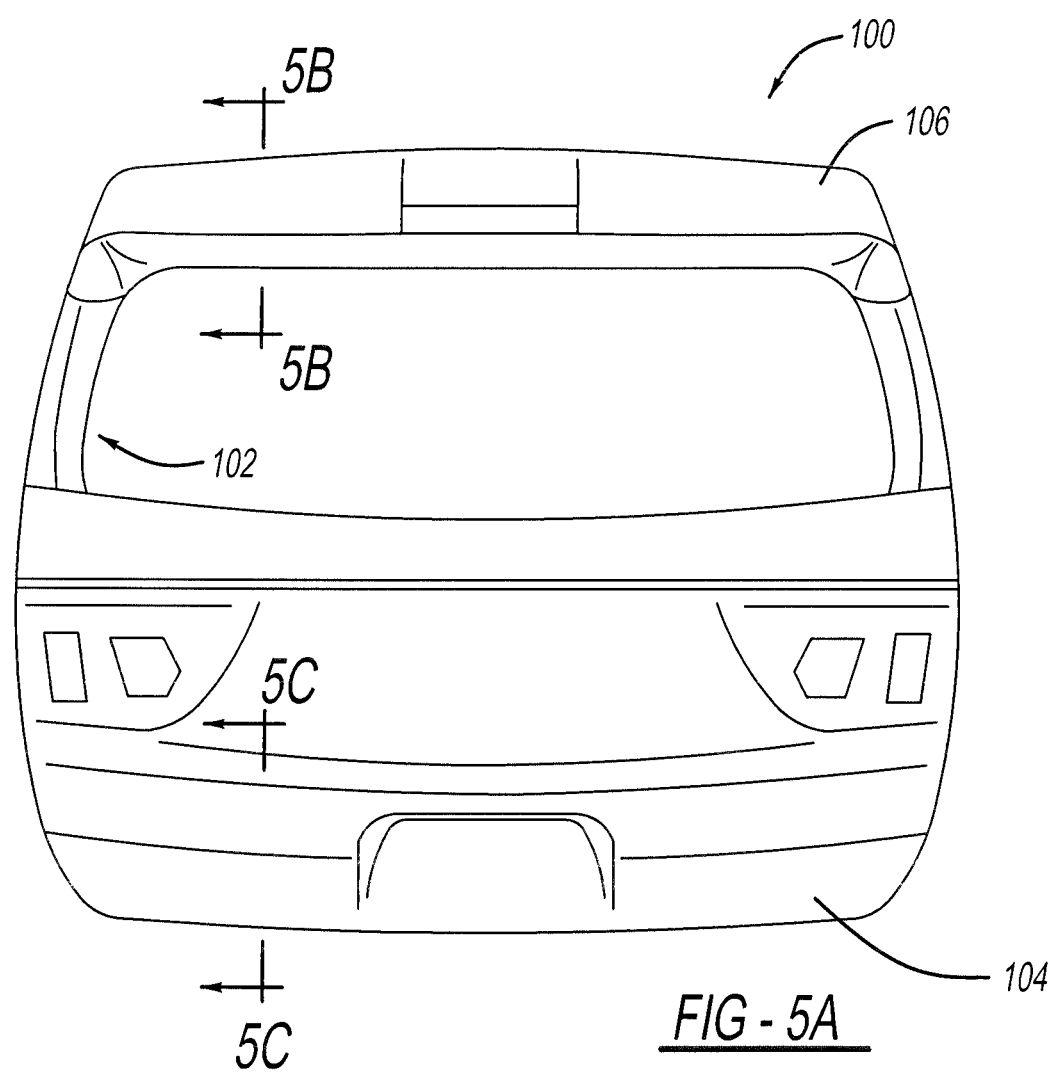
FIG. 5A is a front elevation view of connected panels of a liftgate assembly, in accordance with an embodiment of the present invention.
Figure 5B:
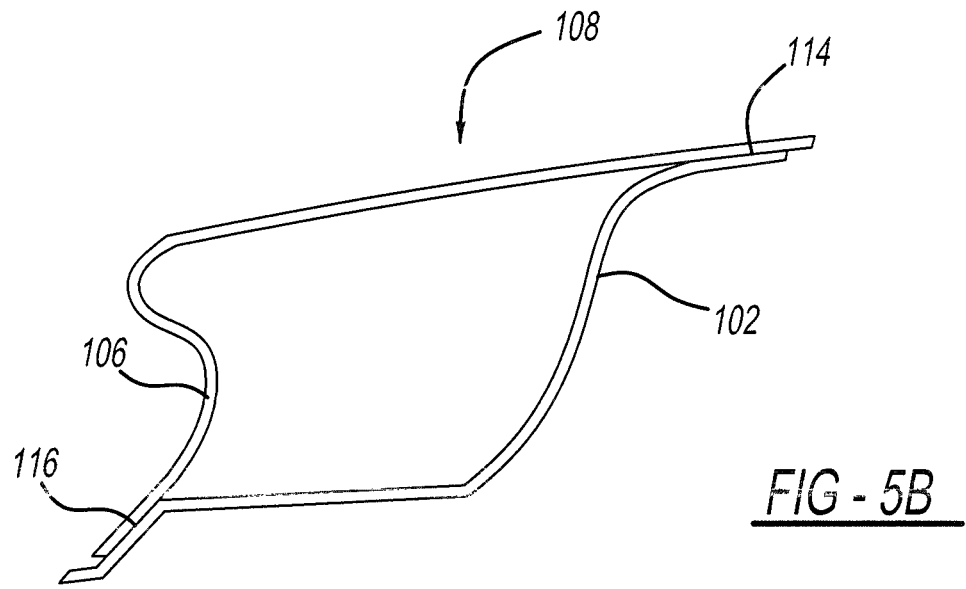
FIG. 5B is a sectional view taken along A-A of FIG. 5A, according to the present invention.
Figure 5C:
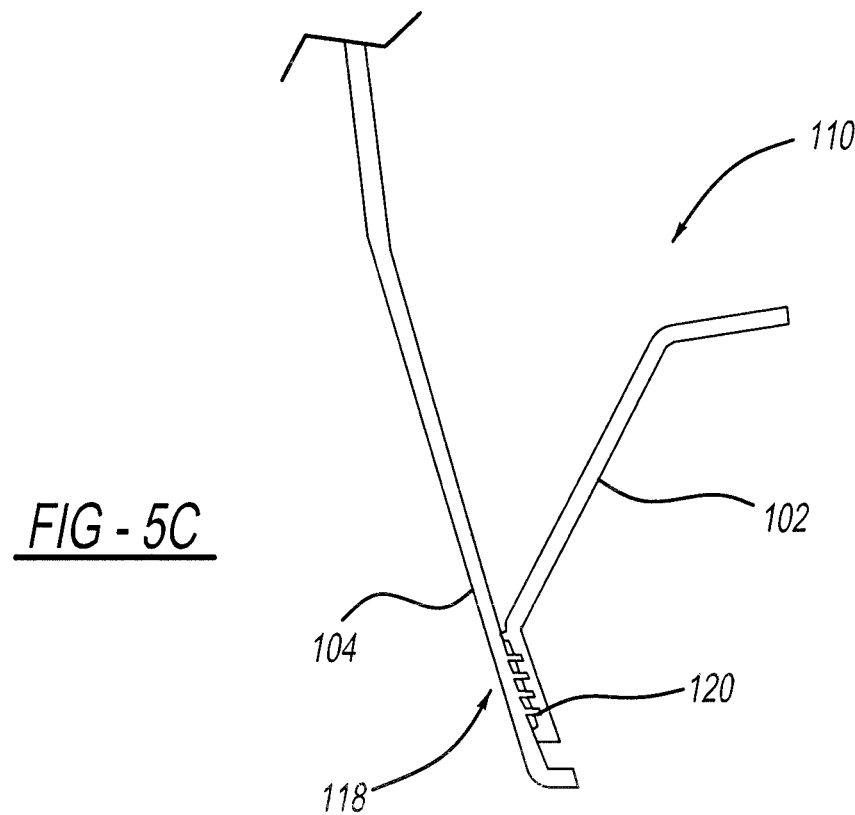
FIG. 5C is a sectional view taken along B-B of FIG. 5A, according to the present invention.

Referring to FIGS. 5A-5D generally, there is illustrated an exemplary exterior body panel assembly that is a liftgate assembly shown generally at 100 comprising an inner panel shown generally at 102 connected to a lower outer panel 104, and connected to an upper outer panel 106. FIGS. 5B and 5C depict weld joints for infrared welding the inner panel 102 to the respective upper outer panel 106 and lower outer panel 104. FIG. 5B is a cross section taken along section A-A of FIG. 5A, and depicts an upper outer assembly, indicated generally at 108, which includes the upper outer panel 106 and inner panel 102 infrared welded together at at least two weld joints 114,116 using a flat-to-flat (or surface-to-surface) configuration. While flat-to-flat is preferred for this area on both sides, alternative joint designs for infrared welding are contemplated including, but not limited to ribs to surface, and ribs to ribs. FIG. 5C is a cross section taken along B-B of FIG. 5A, and depicts a lower outer assembly, indicated generally at 110, which includes the lower outer panel 104 and inner panel 102 infrared welded together at at least one weld joint shown generally at 118 using a plurality of ribs 120 to form a ribs-to-flat (or rib-to-surface) weld joint configuration. While ribs-to-flat is preferred for this area on both sides, alternative joint designs for infrared welding are contemplated including, but not limited to, surface to surface, and ribs to ribs. The plurality of ribs 120 can be formed on either the inner panel 102 or either lower outer panels 104, 106. However, it is most preferred that ribs are located on the inner panel 102, rather than the lower outer panel 104 or upper outer panel 106, to form weld seam that is furthest from the finished show surface of the outer panels 104,106 to reduce or eliminate read through to the show surface.

Preferably, flat-to-flat and rib-to-flat joint geometries are the primary weld joint geometries incorporated in the panels of the liftgate assembly. However, other joint geometries suitable for desired welding strength and surface appearance are contemplated without departing from the scope of the invention.

In addition, the ribs are straight ribs, thin ribs, wavy ribs, flat ribs or any other shape(s), and/or, a plurality of ribs suitable for providing the desired welding strength and surface appearance depending on the application. The flat surface on the upper area of the inner panel 102, for example, has a weld surface that is stepped, or, alternatively, substantially flat to blend the transition and substantially remove the step.

The selection of joint design, in combination with component design, geometry used, and optimal process parameters used, reduces or eliminates issues such as undesirable sink areas, "rib trace", and etc, while still obtaining the desired weld needed to meet weld strength and other requirements (e.g., predetermined weld strength as determined by lap shear testing, predetermined surface appearance). "Rib trace" is commonly referred to as undesirable the condition where the ribs are visible on the show surface. There are several predetermined process variables, e.g., heat, pressure, emitter distance, hold time, Class A surface cooling, etc.

Figure 5D:
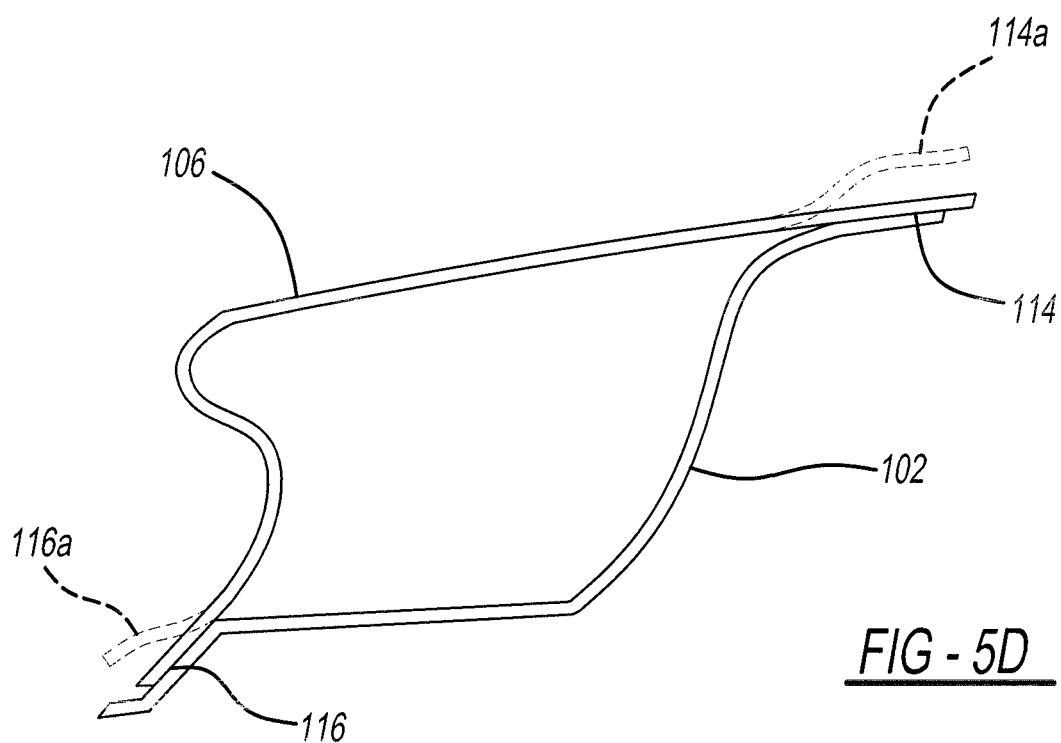
FIG. 5D is a sectional view taken along A-A of FIG. 5A illustrating an exemplary out of tolerance panel shown in phantom brought into tolerance at weld joints, according to the present invention.

FIG. 5D illustrates the upper outer panel 106 out of tolerance near the areas to be infrared welded. This is shown in phantom at 114a and 116a. When infrared welded to the inner panel 104 at weld joints 114 and 116, these out-of-tolerance areas are keyed into tolerance. By way of example, 4-6 mm out of tolerance (e.g., under flush) in the weld surfaces 114a,116a prior to infrared welding are, through the process of the present invention, adjusted and brought into tolerance when the heated surfaces are clamped together for a predetermined time. This is capable of being done without the use of glue to act as a filler between the warped halves, which is a significant benefit over conventional processes.

According to the present invention, a general weld design geometry is about 0.2 to 1.5 millimeters. Typically, 0.2 to 1.1 mm. Preferably, 0.3 to 1.0 mm. More preferably, about 1.0 mm weld interference in one or more locations, and 0.3 mm in one or more other places. Most preferably, a 0.2 to 0.4 mm weld.

Preferably, the lower and/or upper outer panels 104, 106 are made of a suitable thermoplastic used as a show surface, such as a thermoplastic polyolefin (TPO). The panels 104, 106 are preferably thermoplastic injection molded with mold-in color, and painted on class A surfaces. Other finished part surfaces or treatments are contemplated without departure from the scope of the present invention.

Preferably, the inner panel 102 is made of a structural thermoplastic, such as a polypropylene-based materials, a thermoset or thermoplastic such as a reinforced polypropylene (RPP), glass-filled polypropylene, etc. The inner panel 102 is preferably thermoplastic injection molded with mold-in color, and, optionally, grain in areas of class A surface(s), and painted.

The thickness of the weld areas of the at least one second panel (e.g., spoiler 106 or lower outer panel 104) can be thinner than that required for vibration welding. Generally, the second panel according to the present invention is at least 2.5 millimeters thick and less than 3.8 mm thick. Typically, the second panel is 3 to 3.4 mm thick. In contrast, vibration welding requirements recommend a thickness of at least 3.8 mm.

It is understood that the assembly 100 can include a plurality of secondary elements, e.g., structural reinforcement features wire harness(es), a tether (e.g., collision tether), each coupled to the inner panel by bonded and/or fasteners. More or less or other elements are contemplated without departing from the scope of the present invention. These structural reinforcement features are metal brackets, structural composite reinforcements, e.g., woven glass reinforcement, or any other kind of suitable reinforcement and location where added strength is desired. The structural reinforcement features are LH/RH hinge reinforcement assemblies, LH/RH strut reinforcement assemblies, LH/RH D-pillar reinforcement assembly, LH/RH band aid brackets, lower band aid bracket, latch reinforcement assemblies and/or any other reinforcement suitable for operably affixing to the inner panel 102 where desired.

Referring now to FIGS. 6-13 generally, in accordance with an embodiment of the invention, there is provided a process for manufacturing the multi-component assembly, e.g., exterior body panel assembly, in particular, such as a liftgate assembly including large panels. The first and second panel geometries, infrared welding fixture geometries, and first and second nest geometries depicted in FIGS. 6-13 are for illustrative purposes. It is understood that other geometries are contemplated depending on the application without departure from the scope of the present invention.

There is provided a first nest 200 for a first panel 202 and a second nest 204 for a second panel 206. The first nest 200 is fabricated to hold a first panel 202 (e.g., inner panel of the liftgate subassembly). The second nest 204 is fabricated to hold a second panel 206 (e.g., lower outer panel or spoiler or modular panel or reinforcement panel). Preferably, the first nest 200 is a moveable lower tool and the second nest 204 is a moveable upper tool.

The nests are preferably aluminum. In one embodiment, the first and second nests 200,204 have a polished surface, which provides the advantage of allowing ease of removal of panels from the molds when desired. Alternatively, a urethane or silicon film could be applied to the nests for easier removal of the panels from the nests.

Figure 8:
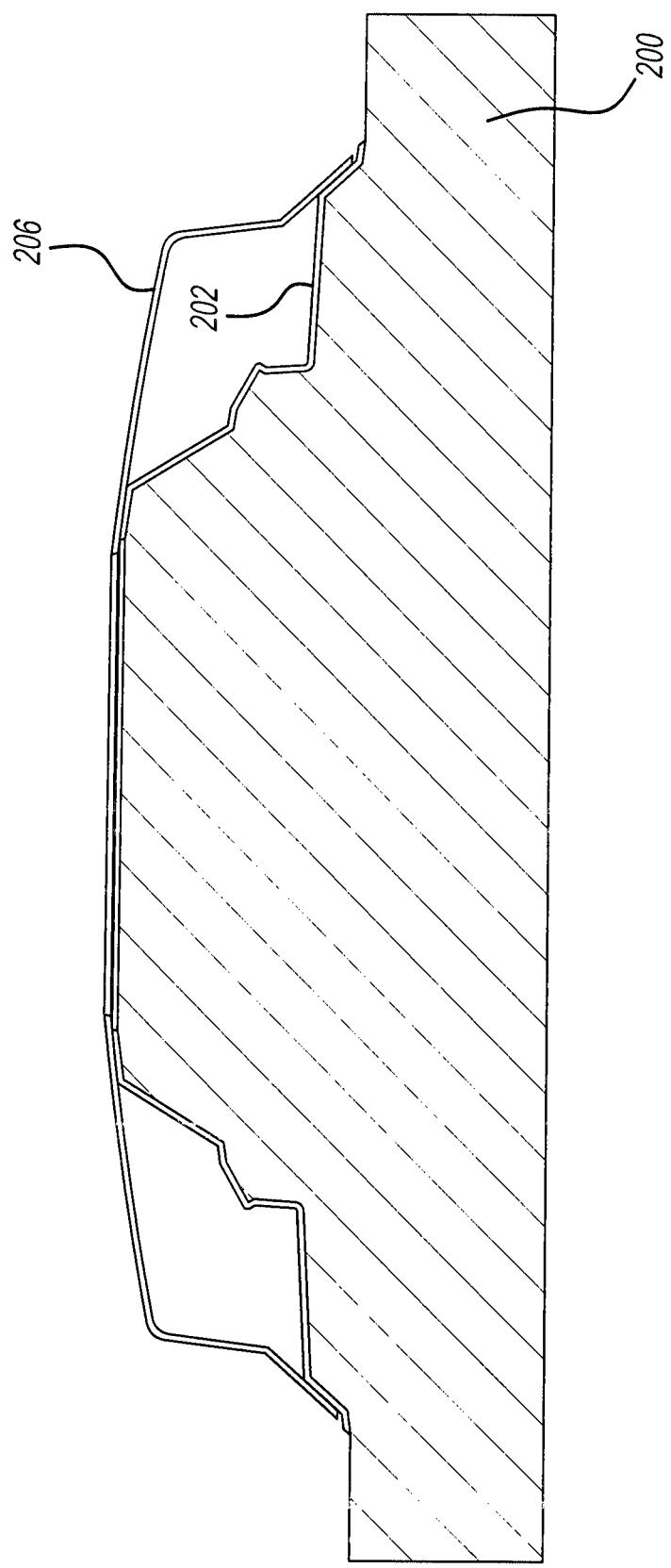
FIG. 8 is a cross-sectional front elevation view of FIG. 6, according to the present invention.

The process includes the steps of loading the first panel 202 into the first nest 200, and then loading the second panel 206 onto the first panel 202. Predetermined weld surfaces 208 (e.g., peripheral weld surfaces) on the first panel 202 are generally aligned with predetermined weld surfaces 212 (e.g., peripheral weld surfaces) on the second panel 206. FIG. 6 depicts the first nest 200 with the first panel 202 loaded to the first nest 200. FIGS. 7-8 depict the second panel 206 loaded onto the first panel 202 after the first panel 202 is loaded into the first nest 200. When the second panel has a finished part surface (e.g., Class A, painted, etc), the non-show surface of the second panel 206 rests against the first panel 202 so that the finished part surface faces outward or generally upward.

Figure 9:
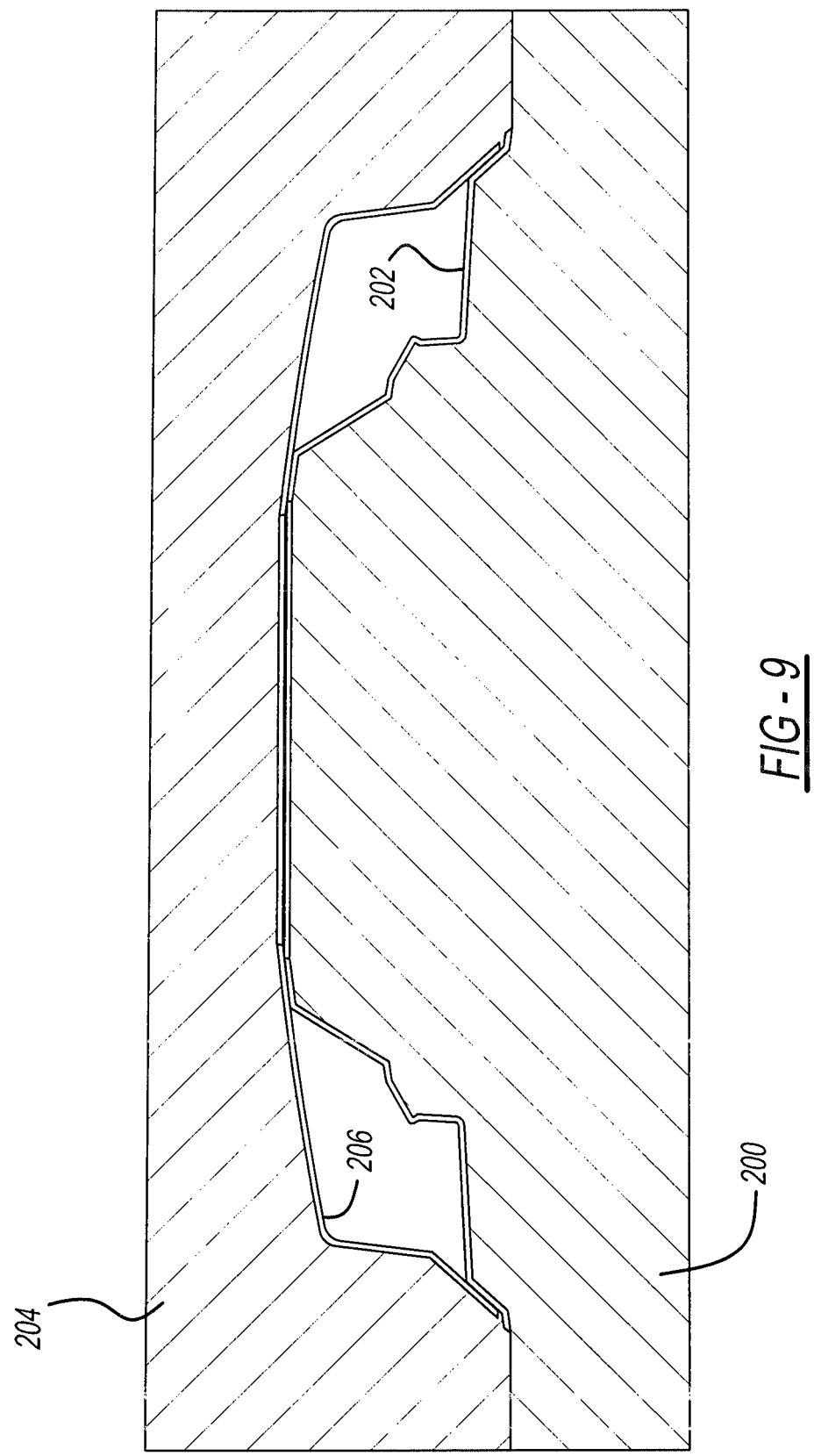
FIG. 9 is a cross-sectional front elevation view depicting the second panel within an exemplary second tool nest and showing the first panel within the first tool nest, according to the present invention.

The first nest 200 and second nest 204 are brought into close proximity to each other, either by both moving toward each other or one moving toward the other, until the second nest 204 contacts the second panel 206 (see FIG. 9). Preferably, this additionally provides a check fit of the first and second panels 202,206 with respect to each other, in particular to align predetermined weld surfaces 208,212, and/or with respect to the first and second nests 200,204.

Preferably, a vacuum is then applied to the second nest 204 to hold the second panel 206 in the second nest 204, or other suitable method for holding onto the second panel 206. Optionally, the first nest 200 can also have a vacuum applied to the first panel 202 or otherwise retain the first panel 202 in the first nest 200 as the panels are separated. Typically, a plurality of vacuum cups in the interior cavity or chambers of the first nest 200 hold the first panel 202, and, a plurality of vacuum cups in the interior cavity or chambers of the second nest 204 hold the second panel 206. These vacuum forces can also be turned off/on when desired depending on the stage(s) in the process.

Figure 10:
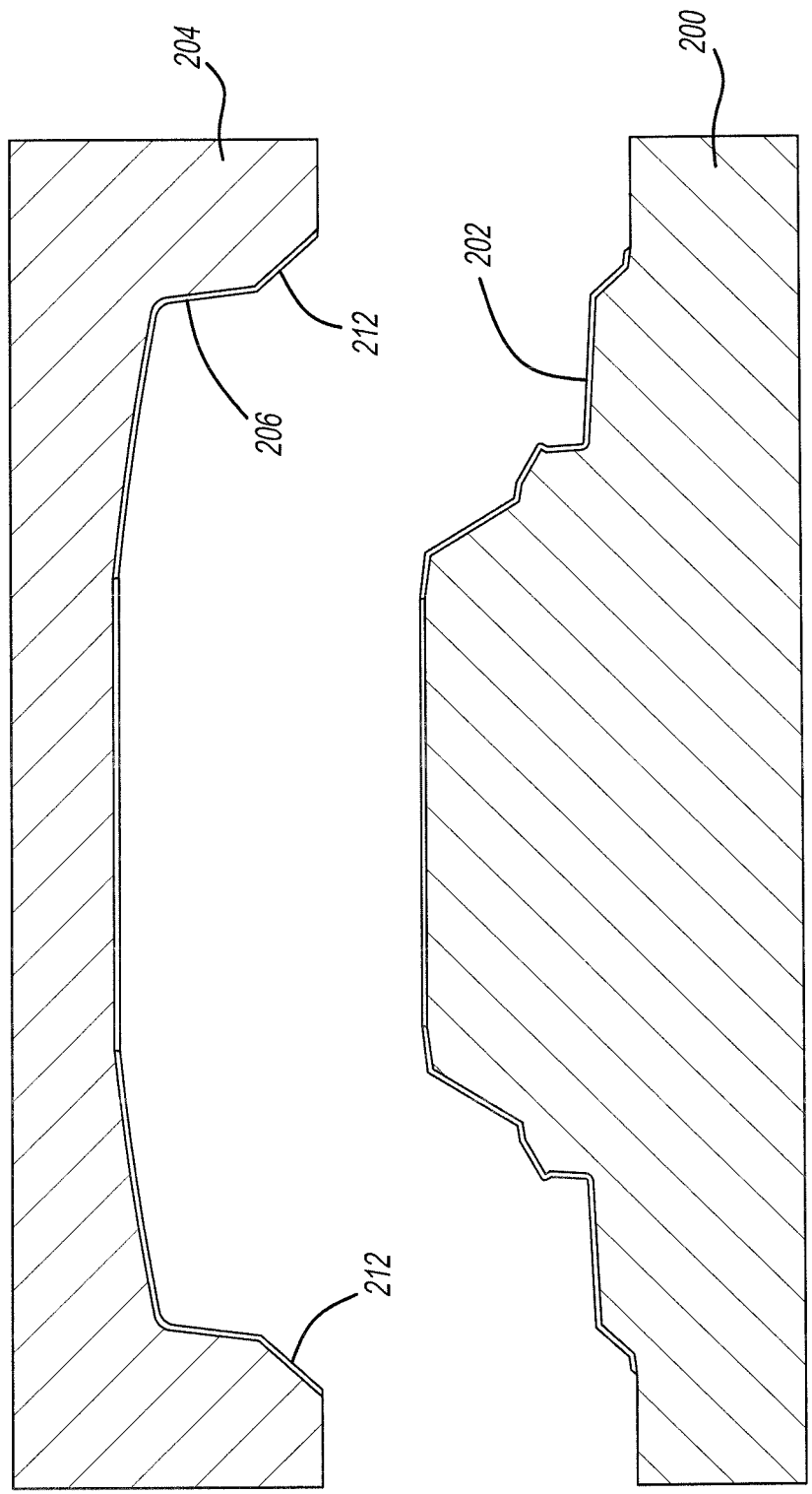
FIG. 10 is a cross-sectional front elevation view depicting the second tool nest separated from the first tool nest, and the second panel held by the second tool nest, according to the present invention.
Figure 11:
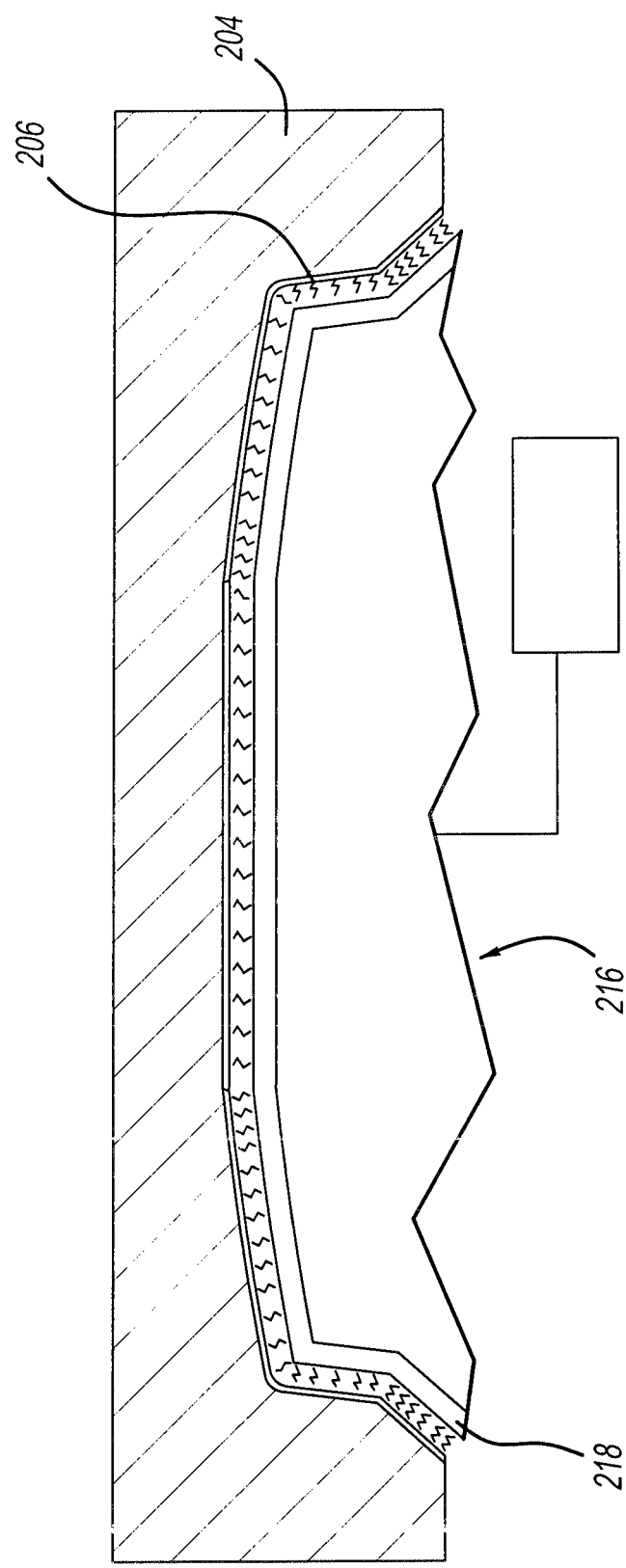
FIG. 11 is a cross-sectional front elevation view of an exemplary infrared welding fixture with at least one infrared heat source heating an adjacent second panel held in the second tool nest, according to an embodiment of the present invention.
Figure 12:
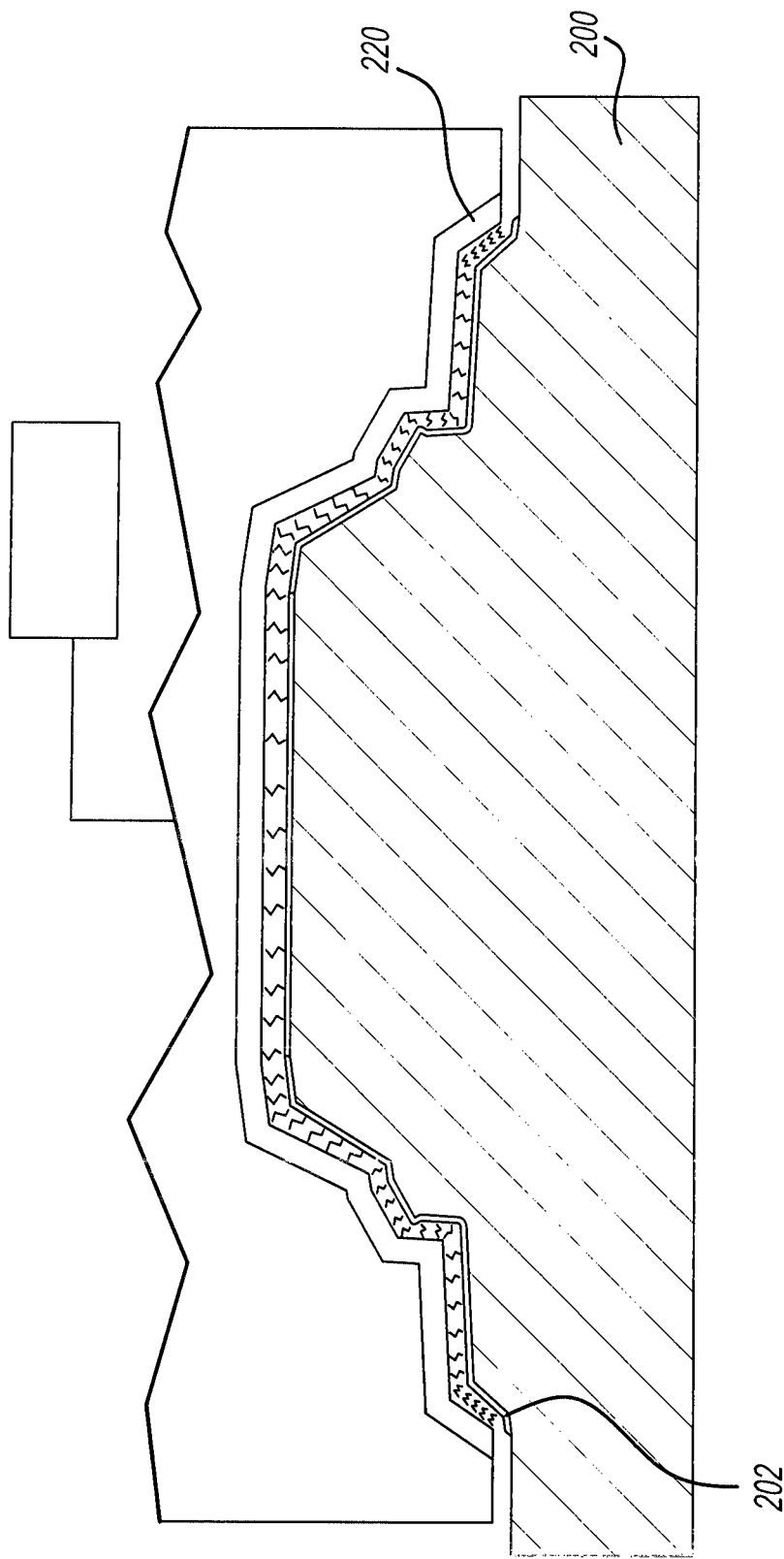
FIG. 12 is a front elevation view of an exemplary infrared welding fixture with at least one infrared heat source adjacent the first panel held in the first tool nest, wherein the infrared heat source is heating weld surfaces on the first panel, according to an embodiment of the present invention; and, FIG. 13 is a cross-sectional front elevation view of the first panel and second panel compressed together by the first and second tool nests, according to the present invention.

The second nest 204 and first nest 200 are then separated from each other, either by moving both or one of the nests away from the other, as the second nest 204 continues to hold the second panel 206 (see FIG. 10).

There is also provided at least one infrared welding fixture shown generally at 216 with a plurality of infrared heat sources 218 and 220. The infrared welding fixture 216 reciprocates (e.g., side to side or forward to back) into and out of infrared weldable proximity with the first and second nests 200,204. The infrared welding fixture 216 is a single fixture with opposing surfaces having the heat sources 218 and 220. Alternatively, a first infrared welding fixture can have the heat sources 218 and a second infrared welding fixture can have the heat sources 220.

After the step of separating the first and second nests 202,204 an operable distance, the infrared welding fixture 216 is then brought into close proximity with the first or second nests 202,204. In a preferred embodiment, the infrared welding fixture 216 is brought between the first and second nests 202, 204 and the first and second nests 202,204 then move toward the infrared welding fixture 216. In particular, for infrared welding, the infrared heat sources 218 and 220, respectively, are a predetermined distance from the respective weld surfaces 208,212 of the first and second panels 202,206 being held in the nests 200,204. Generally, the infrared heat sources 218,220 distance to the respective panels 202,206 is less than 20 millimeters; typically, 3-18 mm; preferably, 8 to 12 mm; most preferably, about 10.5 mm. Greater or lesser distance is contemplated without departing from the scope of the present invention.

The predetermined locations of the plurality of infrared heat sources 218,220 corresponds to the particular exterior body panel components to be welded and desired weld locations. The infrared heat sources 218,220 can be more or less than that depicted in the figures depending upon the application. The configuration and locations of the infrared heat sources 218,220 can also be different than those depicted in the figures without departing from the scope of the present invention. Preferably, the infrared welding structure has a net fit cut generally to the outer profile of one panel, and a net fit cut generally to the inner profile of the other panel.

The plurality of infrared heat sources used to heat the predetermined weld surfaces 208,212 are bulbs, wires, spoils, mirror-welding metal hot plates, plaques, foils, vertical foils, horizontal foils, single glass bulb tubes, double glass bulb tubes, quartz glass bulb tubes, meal foils or combinations thereof.

The infrared welding fixture 216 can be moved by end of arm tooling, a carrier, a ceramic carrier or any other reciprocating device suitable for moving the infrared welding fixture 216 into proximity for infrared welding and then out of the way for compression. At least one heat source 218 is provided on the infrared welding fixture 216 toward the non-show surface of the second panel 206 when the second panel 206 is being held in the second nest 204. At least one heat source 220 is provided on the infrared welding fixture 216 toward the first panel 202 when the first panel 202 is being held in the first nest 200.

Once the plurality of heat sources 218,220 are positioned for infrared welding, the targeted panel areas are heated (as indicated by waves in FIGS. 11 and 12) for a predetermined time to a predetermined temperature. The heating source power is preferably 100%. Greater or lesser power percentage is contemplated without departing from the scope of the present invention. Generally, the heating time is generally greater than 2 seconds; typically, greater than 6 seconds; preferably, greater than 8.5 seconds; more preferably 6-9 seconds; most preferably 15 seconds or less. Optionally, the first and second panels 202,206 are held together in place after heating. Holding time is generally greater than 2 seconds; typically, greater than 4 seconds, preferably, greater than 6.5 seconds; most preferably 4-7 seconds. Greater or lesser heating time or holding time is contemplated without departing from the scope of the present invention. The heating and holding times can be factors that affect weld strength. Thereafter the infrared welding fixture 216 will be moved out of the way for compression performed by the first and second nests 200,204.

There is about 1 millimeter of melt when the first and second panels 202,206 are heated. More or less melt is contemplated without departing from the scope of the invention.

The heating temperature(s) generally depend on the panel material, dimensions and show surfaces. Depending on the parameters, about 180° degrees for melting the material. However, the temperature is higher or lower depending on the application without departure from the scope of the present invention. According to an embodiment of the present invention, the infrared heat sources 218,220 heat the respective panels to different temperatures. Preferably, the heat is as low as possible for any panel having a finished show surface. By way of example, an outer panel with a painted Class A surface has lower heat than the inner panel. The inner panel could be overheated so that some heat transfers from the weld surfaces of the inner panel to the weld surfaces of the outer panel when the panels are clamped together. Most preferably, the difference between the second panel 206 heating temperature and the first panel heating 202 temperature is about 120-150° C. Preferably, any panel with a show surface, e.g., the second panel 206, does not exceed about 50° C. on the finished part surface to prevent read through to the finished part surface.

The infrared heat sources 218,220 are preferably medium wave length infrared sources. Generally, the peak is less than about 3 μm. Typically, about 2 to 3 μm. This is a compromise on radiation intrusion into the material and maximum absorption on the surface. This is based on the material research of FTIR spectra and the optical depth of penetration. The main purpose is to heat only the targeted surface as quickly as possible and leave the rest of the material as cold as possible.

After heating, infrared heating fixture 216 is moved out of proximity to the first and second panels 202,206. Preferably, the first and second nests 200,204 are moved away from the infrared heat sources 218,220 and the infrared heating fixture 216 is removed from between the nests 200,204 so that the first and second nests 200,204 can then come together to compress the heated first and second panels 202,206 together.

Thus immediately after heating, the first and second panels 202,206 are clamped together, as indicated by the arrows depicted in FIG. 13, for joining and cooling of the joined surfaces in the clamped arrangement. Generally, the mating force is less than 20 kilonewton; typically, 2 to 15 KN; preferably, 5 to 10 KN; most preferably, about 7.5 KN. Greater or lesser mating force is contemplated without departing from the scope of the present invention.

Generally, the clamping time is greater than 5 seconds; typically, greater than 8 seconds, preferably, 9-20 seconds; more preferably about 11 seconds; most preferably about 5-10 seconds. Greater or lesser clamping time is contemplated without departing from the scope of the present invention. Generally, the clamping pressure is greater than 5; typically, less than 50; preferably, 5 to 30; most preferably, about 7.5. Greater or lesser clamping pressure is contemplated without departing from the scope of the present invention.

By way of non-limiting example, the first panel 202 can be molded with higher packing pressure to reduce rib trace.

Preferably, the welded together panels are allowed to cool somewhat by keeping the panels in the nest for about 5 to 8 seconds before removing the joined panels. Alternatively, forced coolant is contemplated without departure from the scope of the present invention.

The weld that results is most preferably about 0.2 to 0.4 mm deep. The weld is around the entire perimeter of the panels so as to also form a continuous weather tight seal. This is significant as not only does the infrared welding according to the present invention connect two or more panels together—but it also eliminates the need for adhesives or sealants for those infrared welded panels.

The first and second nests 200,204 are then separated, and the assembly removed from the first nest 200.

However, according to an embodiment of the present invention, the infrared welded subassembly stays in the first nest 200 for attachment of at least one other panel (e.g., e.g., another outer panel or modular panel or reinforcement panel). Generally, the at least one other panel has a different geometry than the second panel 206. Further, the predetermined weld surfaces on the first panel 202 where the additional panel is to be infrared welded is in a different location and has weld surfaces that correspond to the additional panel. Accordingly, there is another infrared welding fixture provided and at least one additional nest that is fabricated to hold another panel (e.g., another outer panel or modular panel or reinforcement panel). The use and operation of the at least one additional nest and corresponding infrared welding fixture with a plurality of infrared heat sources is identical to the second nest 204, except that each additional nest and infrared welding fixture has a different geometry to accommodate the geometry of the additional panel, and to accommodate infrared welding that panel in another location on the first panel 202. Thus, after the second panel 206 and first panel 202 are infrared welded together and the nests 200,204 separated, the process as described above is equally applicable to infrared welding of the additional panel to the first panel 202. For example, a lower outer panel (or spoiler or modular panel or reinforcement panel, etc.) is loaded onto another location of the first panel 202. The additional nest and first nest 200 are brought into close proximity to each other, either by both moving toward each other or one moving toward the other, until the additional nest contacts the additional panel (similarly as described previously and similarly as illustrated in FIG. 9 but with different geometries) for check fit. The first nest 200 and additional nest are separated with the additional panel being held in the additional nest. The infrared heat sources are brought into proximity with a predetermined weld location on the first panel 202 and the additional panel (similarly as described previously and similarly as illustrated in FIG. 11-12 but with different geometries). After heating, the first nest 200 and additional nest are separated and the infrared welding fixture removed from between the nests. The corresponding weld surfaces of the first panel 202 and additional panel are aligned and pressed together by bringing the first nest 200 and additional nest into compression position (similarly as described previously and similarly as illustrated in FIG. 13 but with different geometries). Exemplary heating and welding and clamping parameters are set forth previously. Any additional panels repeat the same infrared welding procedure.

While a liftgate assembly is depicted throughout the figures and described herein, it is within the scope of the invention for the exterior body panel assembly to be any type of infrared welded assembly, including, but not limited to, a front end carrier, door assembly, hood assembly, bumper assembly, tailgate assembly, multi-piece construction or any other type of exterior body assembly of any kind, in particular, those body panels having a Class-A, painted thermoplastic component, etc.

The entire cycle time is much faster than conventional bonding, which can take about 8 minutes. Generally, the total infrared welding cycle time of the present invention is 75 seconds or less, typically 30-90 seconds, preferably 45-80 seconds. Thus instead of one part every 8 minutes, the present invention can weld together a plurality of panels in that same time. Adhesives for example stay soft for a much longer time. Furthermore, if a warp (or other tolerance variation) was present before bonding, that warp remains even after bonding because there is permanent stress on the joint (shear stresses in the joint, creep in the joint, etc).

According to the present invention combinations of process and design variables are determined to achieve desired results. For example, the highest weld strength is not necessarily the most desired from a visual appearance standpoint. A minimum acceptable range of weld strength to visual appearance is desired to achieve strength without sacrificing Class A appearance. Accordingly, there are several process and design variables taken into consideration. Exemplary processing variables include, temperature, heating time, emitter distance, clamping pressure, press speed, hold time, cooling, etc. Exemplary design variables include, part material(s); part geometry, e.g., joint area geometry being flat, ribs, etc; part warpage (maximum); weld flange thickness (optimal); and weld interference (optimal), etc.

Read through is generally thought to be more critical according to aspects of the present invention. The weld strength needs to be strong enough for part performance but without being detrimental to the Class A appearance of the part. The present invention provides superior and unexpected results with a combination of weld strength and reduced or eliminated read through on difficult sensitive Class-A surfaces, such as painted TPO, of large parts.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A composite liftgate for a vehicle comprising:
   an inner panel formed of composite material with an outside surface having a lower surface area extending across substantially the entire width of the composite liftgate structure;
   at least one outer panel formed of composite material, the at least one outer panel being infrared welded to the inner panel;
   at least two weld joints each having a weld between the inner panel and the outer panel, wherein a first of the at least two weld joints is a flat to flat configuration where the weld joint is between a flat surface on the inner panel and a first flat surface on the outer panel and a second of the at least two weld joints is a rib to flat configuration where the weld joint is between ribs formed on the lower surface of the inner panel and a second flat surface of the outer panel.

2. The composite liftgate for a vehicle of claim 1 wherein the composite material is one selected from the group consisting of polypropylene based materials, a thermoset plastic, thermoplastic, reinforced polypropylene, and glass-filled polypropylene.

3. The composite liftgate for a vehicle of claim 1 wherein the at least one outer panel has a thickness in a range of one selected from the group consisting of at least 2.5 mm and less than 3.8 mm and 3 mm to 3.4 mm.

4. The composite liftgate for a vehicle of claim 1 wherein the inner panel has unidirectional tape over molded onto the composite material of the inner panel, wherein the unidirectional tape forms a tether that can take up load after an accident to reduce or prevent fragments of the inner panel from passing into the vehicle.

5. The composite liftgate for a vehicle of claim 4 wherein the unidirectional tape is glass fiber or woven fiber that is preimpregnated with polypropylene and over molded to the inner panel.

6. The composite liftgate for a vehicle of claim 4 wherein the inner panel has a plurality of molded ribs at locations where the unidirectional tape will bridge the top of each of the plurality of molded ribs thereby maintaining slack of the unidirectional tape, wherein the slack of the unidirectional tape is designed to take up load after an accident.

7. A composite liftgate for a vehicle comprising:
an inner panel formed of composite material with an outside surface having a lower surface area extending across substantially the entire width of the composite liftgate structure;
an upper outer panel formed of composite material and infrared welded to the inner panel;
a lower outer panel formed of composite material and infrared welded to the inner panel;
a plurality of weld joints between the upper outer panel assembly and the inner panel, wherein each one of the plurality of weld joints have a flat to flat configuration where the weld is between two flat surfaces of the inner panel and two flat surfaces of the upper outer panel; and
a plurality of weld joints between the lower outer panel assembly and the inner panel, wherein each one of the plurality of weld joints have a rib to flat configuration where the weld is between ribs formed on the lower surface of the inner panel and a flat surface of the outer panel.

8. The composite liftgate for a vehicle of claim 7 wherein the composite material is one selected from the group consisting of polypropylene based materials, a thermoset plastic, thermoplastic, reinforced polypropylene, and glass-filled polypropylene.

9. The composite liftgate for a vehicle of claim 7 wherein the upper outer panel and the lower outer panel each have a thickness in a range of one selected from the group consisting of at least 2.5 mm and less than 3.8 mm and 3 mm to 3.4 mm.

10. The composite liftgate for a vehicle of claim 7 wherein the inner panel has unidirectional tape over molded onto the composite material of the inner panel, wherein the unidirectional tape forms a tether that can take up load after an accident to reduce or prevent fragments of the inner panel from passing into the vehicle.

11. The composite liftgate for a vehicle of claim 7 wherein the unidirectional tape is glass fiber or woven fiber that is preimpregnated with polypropylene and over molded to the inner panel.

12. The composite liftgate for a vehicle of claim 7 wherein the inner panel has a plurality of molded ribs at locations where the unidirectional tape will bridge the top of each of the plurality of molded ribs thereby maintaining slack of the unidirectional tape, wherein the slack of the unidirectional tape is designed to take up load after an accident.

13. A composite liftgate for a vehicle comprising:
an inner panel formed of composite material with an outside surface having a lower surface area extending across substantially the entire width of the composite liftgate structure;
an upper outer panel formed of composite material and infrared welded to the inner panel;
a lower outer panel formed of composite material and infrared welded to the inner panel;
a plurality of weld joints between the upper outer panel assembly and the inner panel, wherein each one of the plurality of weld joints have a flat to flat configuration where the weld is between two flat surfaces of the inner panel and the upper outer panel;
a plurality of weld joints between the lower outer panel assembly and the inner panel, wherein each one of the plurality of weld joints have a rib to flat configuration where the weld is between ribs formed on the lower surface of the inner panel and a flat surface of the outer panel;
unidirectional tape over molded into the composite material of the inner panel at an area of the inner panel adjacent the lower outer panel, wherein the unidirectional tape forms a tether that can take up load after an accident to reduce or prevent fragments of the inner panel from passing into the vehicle.

14. The composite liftgate for a vehicle of claim 13 wherein the composite material is one selected from the group consisting of polypropylene based materials, a thermoset plastic, thermoplastic, reinforced polypropylene, and glass-filled polypropylene.

15. The composite liftgate for a vehicle of claim 13 wherein the upper outer panel and the lower outer panel each have a thickness in a range of one selected from the group consisting of at least 2.5 mm and less than 3.8 mm and 3 mm to 3.4 mm.

16. The composite liftgate for a vehicle of claim 13 wherein the unidirectional tape is glass fiber or woven fiber that is preimpregnated with polypropylene and over molded to the inner panel.

17. The composite liftgate for a vehicle of claim 13 wherein the inner panel has a plurality of molded ribs at locations where the unidirectional tape will bridge the top of each of the plurality of molded ribs thereby maintaining slack of the unidirectional tape, wherein the slack of the unidirectional tape is designed to take up load after an accident.

* * * * *